(12) United States Patent
D'Agostino (10) Patent No.: US 12,130,896 B2
(45) Date of Patent: Oct. 29, 2024

(54) SYSTEM AND METHOD FOR AUTHORIZING DATA TRANSFERS

(71) Applicant: The Toronto-Dominion Bank, Toronto (CA)

(72) Inventor: Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 353 days.

(21) Appl. No.: 17/380,513

(22) Filed: Jul. 20, 2021

(65) Prior Publication Data

US 2023/0021985 A1 Jan. 26, 2023

(51) Int. Cl.
*G06F 21/31* (2013.01)
*G06F 21/60* (2013.01)

(52) U.S. Cl.
CPC ............ *G06F 21/31* (2013.01); *G06F 21/606* (2013.01)

(58) Field of Classification Search
None
See application file for complete search history.

(56) References Cited

U.S. PATENT DOCUMENTS

| | | | |
|---|---|---|---|
| 7,548,886 B2 | 6/2009 | Kirkland et al. | |
| 7,669,760 B1 | 3/2010 | Zettner | |
| 7,849,020 B2 | 12/2010 | Johnson | |
| 8,751,801 B2 | 6/2014 | Harris et al. | |
| 8,893,230 B2* | 11/2014 | Oberheide | H04L 63/0815 |
| | | | 726/8 |
| 9,202,206 B2 | 12/2015 | Sines et al. | |
| 9,374,369 B2 | 6/2016 | Mahaffey et al. | |
| 9,544,143 B2 | 1/2017 | Oberheide et al. | |
| 9,692,815 B2 | 6/2017 | Caldwell | |
| 9,754,097 B2 | 9/2017 | Hessler | |
| 10,587,614 B2 | 3/2020 | Brown | |
| 10,749,935 B1* | 8/2020 | Bush | H04W 4/80 |
| 10,812,476 B2 | 10/2020 | Alexander | |
| 10,820,203 B2 | 10/2020 | Robinton | |
| 2004/0193919 A1* | 9/2004 | Dabbish | G06F 21/10 |
| | | | 726/8 |
| 2010/0036817 A1* | 2/2010 | Bae | G06F 21/6218 |
| | | | 707/E17.014 |
| 2011/0060789 A1* | 3/2011 | Xiang | H04L 63/0245 |
| | | | 709/219 |

(Continued)

OTHER PUBLICATIONS

Create a Trust Relationship Between an Agent Host and a Remote Host; CA Process Automation—4.3; Aug. 24, 2020 (Year: 2020).*

*Primary Examiner* — James R Turchen
(74) *Attorney, Agent, or Firm* — BORDEN LADNER GERVAIS LLP; Curtis Behmann (57) ABSTRACT

Systems and methods for authorizing data transfers are disclosed. Exemplary implementations may: receive a data transfer authorization request based on a data transfer initiated by a customer computing device; when the customer computing device is associated with a system of trust: send a third-party second-factor authentication message to trustee computing device(s) without sending any message to the customer computing device, and authorize the data transfer system to complete the data transfer request in response to receipt of a third-party authentication confirmation from the trustee computing device(s) and in the absence of any authentication confirmation from the customer computing device.

20 Claims, 5 Drawing Sheets

(56) References Cited

U.S. PATENT DOCUMENTS

| | | | |
|---|---|---|---|
| 2011/0142234 A1 | 6/2011 | Rogers | |
| 2011/0202466 A1 | 8/2011 | Carter | |
| 2011/0238448 A1* | 9/2011 | Maresh | G16H 30/20 |
| | | | 705/3 |
| 2013/0091214 A1* | 4/2013 | Kellerman | G06Q 10/00 |
| | | | 709/204 |
| 2013/0091582 A1* | 4/2013 | Chen | H04N 21/8358 |
| | | | 726/26 |
| 2013/0132519 A1* | 5/2013 | Walsh | G06Q 10/00 |
| | | | 709/217 |
| 2014/0189808 A1* | 7/2014 | Mahaffey | G06F 21/6245 |
| | | | 726/4 |
| 2015/0163217 A1* | 6/2015 | Lo | H04L 51/212 |
| | | | 707/748 |
| 2016/0248778 A1* | 8/2016 | Erdal | H04L 63/102 |
| 2016/0283941 A1 | 9/2016 | Andrade | |
| 2018/0007053 A1* | 1/2018 | Grant | H04L 63/102 |
| 2018/0089411 A1* | 3/2018 | Chakraborty | G06F 21/40 |
| 2018/0167877 A1* | 6/2018 | Guzik | H04W 4/06 |
| 2018/0213043 A1* | 7/2018 | Ravishankar | H04L 67/06 |
| 2018/0300693 A1 | 10/2018 | Gopinath et al. | |
| 2019/0199776 A1* | 6/2019 | Pan | H04L 67/06 |
| 2019/0303559 A1 | 10/2019 | Hamel et al. | |
| 2019/0364049 A1* | 11/2019 | Boss | G06F 21/45 |
| 2021/0097023 A1* | 4/2021 | Hayes | H04L 63/083 |

* cited by examiner

SYSTEM AND METHOD FOR AUTHORIZING DATA TRANSFERS

FIELD

The present disclosure relates to data transfers, including but not limited to computing platforms, methods, and storage media for authorizing or processing instructions associated with one or more data transfers.

BACKGROUND

A data transfer request, such as a transaction request, can undergo authentication or verification to ensure that the transaction request is legitimate and should be trusted.

In some situations, there are more vulnerable customers, such as the elderly or others who have reduced capacity, for whom a typical two-factor authentication or verification can be frustrating and unhelpful. In such cases, the second-factor authentication does not achieve the desired intent for the customer or for the institution being asked to perform the data transfer.

Improvements in approaches for authorizing or processing instructions associated with one or more data transfers are desirable.

SUMMARY

One aspect of the present disclosure relates to a computing platform or system of trust configured for processing instructions associated with one or more data transfers. The system may include a non-transient computer-readable storage medium having executable instructions embodied thereon. The system may include one or more hardware processors configured to execute the instructions. The processor(s) may execute the instructions to receive, from a data transfer system, a data transfer authorization request, the data transfer authorization request being based on a data transfer initiated by a customer computing device associated with a customer. The processor(s) may execute the instructions to determine whether the customer computing device is associated with the system of trust such that the association defines a trust relationship between the customer and one or more trustees. The processor(s) may execute the instructions to, when the customer computing device is associated with the system of trust, send a third-party second-factor authentication message to one or more trustee computing devices associated with the one or more trustees without sending any message to the customer computing device. The processor(s) may execute the instructions to, when the customer computing device is associated with the system of trust, authorize the data transfer system to complete the data transfer request in response to receipt of a third-party authentication confirmation from the one or more trustee computing devices and in the absence of any authentication confirmation from the customer computing device.

Another aspect of the present disclosure relates to a method for authorizing or processing instructions associated with one or more data transfers. The method may include receiving, from a data transfer system, a data transfer authorization request, the data transfer authorization request being based on a data transfer initiated by a customer computing device associated with a customer. The method may include determining whether the customer computing device is associated with a system of trust such that the association defines a trust relationship between the customer and one or more trustees. The method may include, when the customer computing device is associated with the system of trust, sending a third-party second-factor authentication message to one or more trustee computing devices associated with the one or more trustees without sending any message to the customer computing device. The method may include, when the customer computing device is associated with the system of trust, authorizing a data transfer system to complete the data transfer request in response to receipt of a third-party authentication confirmation from the one or more trustee computing devices and in the absence of any authentication confirmation from the customer computing device.

Yet another aspect of the present disclosure relates to a non-transient computer-readable storage medium having instructions embodied thereon, the instructions being executable by one or more processors to perform a method for processing instructions associated with one or more data transfers. The method may include receiving, from a data transfer system, a data transfer authorization request, the data transfer authorization request being based on a data transfer initiated by a customer computing device associated with a customer. The method may include determining whether the customer computing device is associated with a system of trust such that the association defines a trust relationship between the customer and one or more trustees. The method may include, when the customer computing device is associated with the system of trust, sending, a third-party second-factor authentication message to one or more trustee computing devices associated with the one or more trustees without sending any message to the customer computing device. The method may include, when the customer computing device is associated with the system of trust, authorizing a data transfer system to complete the data transfer request in response to receipt of a third-party authentication confirmation from the one or more trustee computing devices and in the absence of any authentication confirmation from the customer computing device.

BRIEF DESCRIPTION OF THE DRAWINGS

Embodiments of the present disclosure will now be described, by way of example only, with reference to the attached Figures.

DETAILED DESCRIPTION

Computing platforms, methods, and storage media for authorizing or processing instructions associated with one or more data transfers are disclosed. Exemplary implementations may: receive, from a data transfer system, a data transfer authorization request based on a data transfer initiated by a customer computing device associated with a customer; determine whether the customer computing device is associated with a system of trust such that the association defines a trust relationship between the customer and one or more trustees; when the customer computing device is associated with the system of trust: send a third-party second-factor authentication message to one or more trustee computing devices associated with the one or more trustees without sending any message to the customer computing device, and authorize the data transfer system to complete the data transfer request in response to receipt of a third-party authentication confirmation from the one or more trustee computing devices and in the absence of any authentication confirmation from the customer computing device.

The present disclosure provides a system and method enabling a customer to identify or designate one or more trusted people as associated with a network of trust. When the customer initiates a data transfer, such as a transaction, and before the data transfer can go through, the data transfer system runs the data transfer request through a system of trust, when such a system of trust is in place. The data transfer system requests that a trustee in the defined network of trust, not the customer, authorize the customer's data transfer. This third-party system of trust is particularly helpful to protect people with reduced capacity, such as the elderly, and can be integrated/retrofitted with existing transaction or data transfer systems, without modifying the underlying system. In an implementation in which the data transfer system is a financial institution, both the customer and the trustee are customers of the financial institution. In another implementation, in which the trustee is not an existing customer with respect to the data transfer system, the data transfer system performs a trustee security process in order to permit a trustee that is not already affiliated with, or have an account with, the data transfer system to participate as a trustee. The trustee security process may include any suitable process, up to and including an intake process similar to a new client intake process.

While some known approaches enable a customer to designate an alternate contact number or method for a two-factor authentication, for example to deal with a situation in which the customer's computing device is unavailable due to low battery or poor signal strength, such known approaches still rely on the customer's ability to make wise or reliable decisions for themselves with respect to data transfer authorization, such as authorizing an electronic transaction. Embodiments of the present disclosure advantageously enable the customer to designate one or more trustees, similar in concept to a power of attorney, to authorize data transfers associated with the customer, and instead of the customer themselves providing the authorization, even when the customer would otherwise have been reachable or technically available to provide the authorization. In an implementation, embodiments of the present disclosure provide a customer with a system of trust through which the customer may designate one or more powers of attorney with respect to data transfers, such as electronic transactions.

Additionally, in other situations, a customer originating a data transfer request is temporarily unable to perform two-factor authentication, for example because they do not have access to their mobile phone, or are in a location without network access or service such that they cannot receive a code via SMS, email or other means. Embodiments of the present disclosure provide an advantage in such situations by enabling the customer to designate a trustee to authorize a data transfer, either as a requirement instead of obtaining authorization from the customer, or as an alternative to obtaining authorization from the customer when the customer is unable to use their computing device to provide the authorization.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

Figure 1:
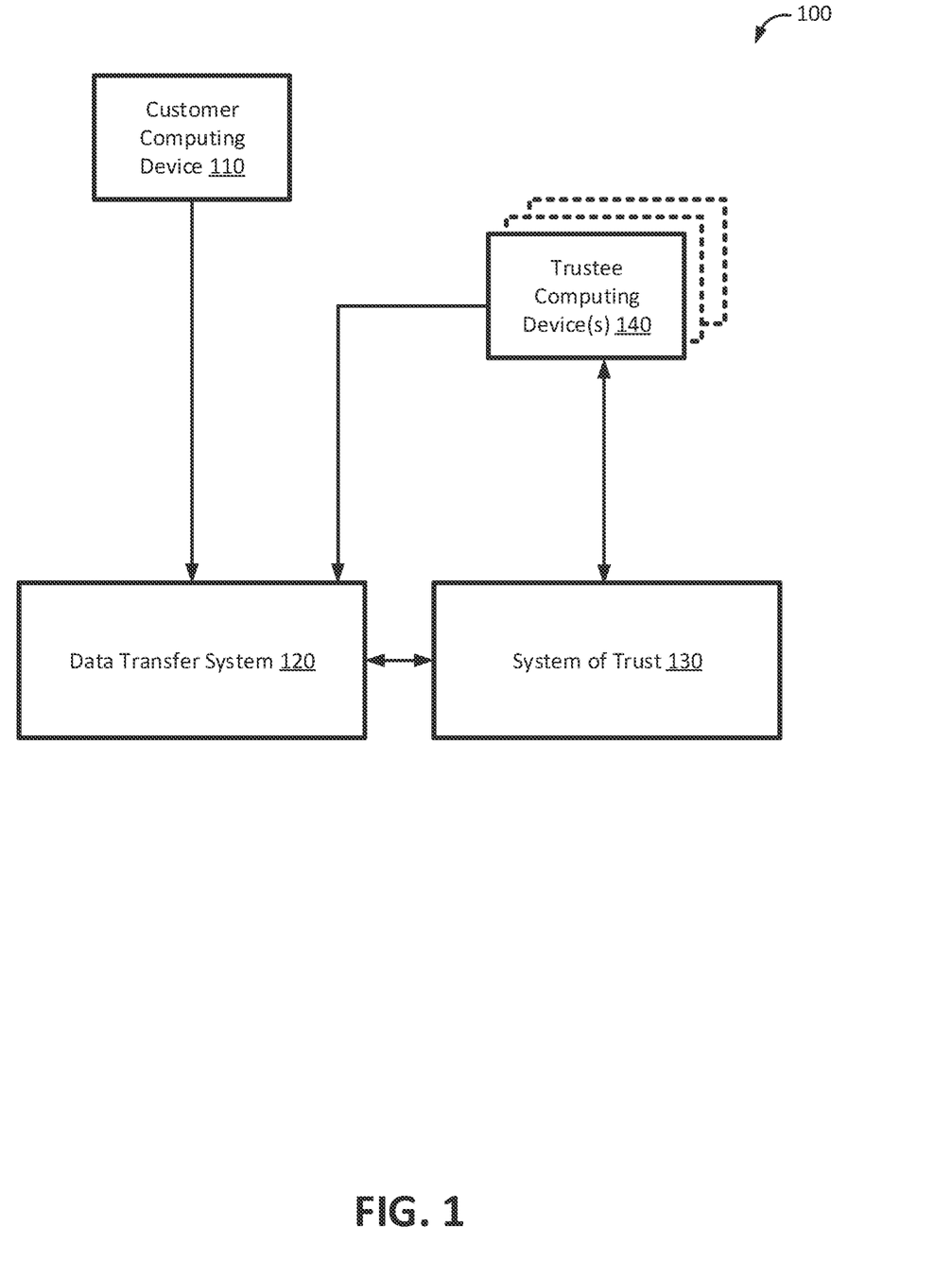
FIG. 1 illustrates a system configured for authorizing or processing instructions associated with one or more data transfers, in accordance with one or more embodiments.

FIG. 1 illustrates a system 100 configured for authorizing or processing instructions associated with one or more data transfers, in accordance with one or more embodiments. The one or more data transfers may be any type of transfer of data from a first computing device to a second computing device, and may be characterized by data transfer instructions. The data transfer instructions may include a source, a destination and a data payload. One example of a data transfer is a secure file transfer from a sender to a recipient, for example sending a sensitive document. Another example of a data transfer is a financial transaction involving a sender account and a recipient account, a transaction type and a transaction amount. In some instances, one or more data transfer authorization requests or messages include(s) instructions relating to one or more data transfers.

The system 100 includes a customer computing device 110, such as a computing device associated with an initiator of the one or more data transfers, for example a customer. The customer computing device 110 is in communication with a data transfer system 120 to perform one or more data transfers. The data transfer system 120 may be any system configured to perform data transfers, for example a data file transfer or a transaction, such as a financial transaction. For example, if the data transfer system 120 comprises a financial institution, the customer is a customer of the financial institution. A system of trust 130 is provided in communication with the data transfer system 120.

The system of trust, or network of trust, 130 is illustrated in FIG. 1 as separate from the data transfer system. In another embodiment, the system of trust 130 may be integrated with the data transfer system 120. A benefit of having the system of trust 130 separate from, and in communication with, the data transfer system 120 is that the functionality associated with the system of trust 130 may be "added" to the data transfer system 120 by enabling suitable communication, and without any substantive modification to the data transfer system 120. Such an arrangement also enables the system of trust 130 to provide data transfer authentication to a plurality of different data transfer systems.

In an example embodiment, the customer computing device may enroll with, or be associated with, the system of trust by defining a trust relationship between the customer and one or more trustees, or trustee computing devices 140. The one or more trustee computing devices 140 are in communication with the system of trust 130, and optionally with the data transfer system 120.

The system of trust 130 is configured to receive, from the data transfer system 120, a data transfer authorization request. The data transfer authorization request is based on a data transfer initiated by the computing device 110 associated with a customer. In an example embodiment, a determination is made, at the data transfer system 120 or at the system of trust 130 or using both systems, whether the computing device is associated with a system of trust such that the association defines a trust relationship between the customer and one or more trustees. In another embodiment, subsequent steps are performed based on results of the determination, which may have been performed previously and in relation to which a determination result is stored in a memory accessible by the data transfer system or the system of trust, or both.

When the customer computing device is associated with the system of trust, the system of trust is configured to: send a third-party second-factor authentication message to the one or more trustee computing devices 140 associated with the one or more trustees without sending any message to the computing device 110; and authorize the data transfer system 120 to complete the data transfer request in response to receipt of a third-party authentication confirmation from the one or more trustee computing devices 140 and in the absence of any authentication confirmation from the computing device 110.

In an example embodiment, when the customer computing device is not associated with the system of trust, then the system of trust 130 is configured to: send a first-party second-factor authentication message to the computing device 110; and authorize the data transfer system 120 to complete the data transfer request in response to receipt of a first-party authentication confirmation from the computing device 110.

In an example embodiment, before a given transaction is authorized to go through, a data transfer system checks to see if a system of trust 130, or network of trust, is in place. If yes, in an embodiment the data transfer system must participate in the system of trust before proceeding with the data transfer.

In an example embodiment of the system of trust 130, one or more trusted persons or trustees participate to protect the customer, such as a customer with reduced capacity, or to assist a customer temporarily unable to perform two-factor authentication. The customer can enroll by way of a trusted authority, and can undergo a third-party know your client (KYC) process to be recognized or onboarded.

In an example embodiment, any time there is a data transfer, such as a transaction, in order to protect the vulnerable person, the data transfer is not allowed to go through unless one or more "trustees" have authorized the transaction. This can be described as a third-party second factor authentication. The third party has to agree and authorize the data transfer to go through. In an implementation, there is an initial registration of trustees, followed by stepping up a level of assurance based on type of data transfer to verify if the associated data transfer authorization request is legitimate.

A customer's network of trust can include more than one trusted person. In some situations, the system of trust 130 may require that every listed trusted person has to provide authorization for the data transfer to go through. For example, when the data transfer comprises a financial transaction requiring financial transaction authorization, depending on the nature of the transaction, a higher level of assurance may be required.

In an example implementation, certain data transfers need authorization from two or more trustees, but other data transfers need a third higher level authorizer/authenticator that can override the subordinates. Another implementation includes multiple systems of trust, for example a nested or sub-network of trust within a higher level network of trust. This is similar to a role-based access model that is decoupled from the system itself.

Today, systems have role-based access built into them, but this can be problematic because of the administration of the different systems to manage the role-based access. Embodiments of the present disclosure add functionality without having to modify the underlying data transfer system. A system of trust 130 according to an embodiment of the present disclosure is external to (sits outside of) the data transfer system 120 in which the data transfer is being performed. This makes it easier to implement a network of trust without having to change permissions or rules relating to role-based access in the data transfer system. An external system of trust can also be shared by a plurality of data transfer systems at a number of different institutions, without having to implement the logic in any of those institutions.

In an example implementation, on initiation, the customer creates a list or network of trusted relationships associated with certain activities/data transfers. Upon initiation of a data transfer request, such as a transaction request, a prompt is sent by the data transfer system to the system of trust advising of the requested transaction and associated attributes, and asking the system of trust to obtain the assurances that are needed. The data transfer system is configured to determine based on the characteristics of the transaction that it is necessary to trigger the system of trust, and contact the system of trust. The system of trust is configured such that trusted people inside the system of trust may set up rules about permissible and impermissible data transfers, for example based on velocity, type of data transfer, transaction amount in the case of a financial transaction, and geographic location, among others. In an example embodiment, a customer may designate a first set of trustees for a first type of data transfer, and designate a second set of trustees for a second type of data transfer, the second type of data transfer being different from the first type of data transfer.

Figure 2:
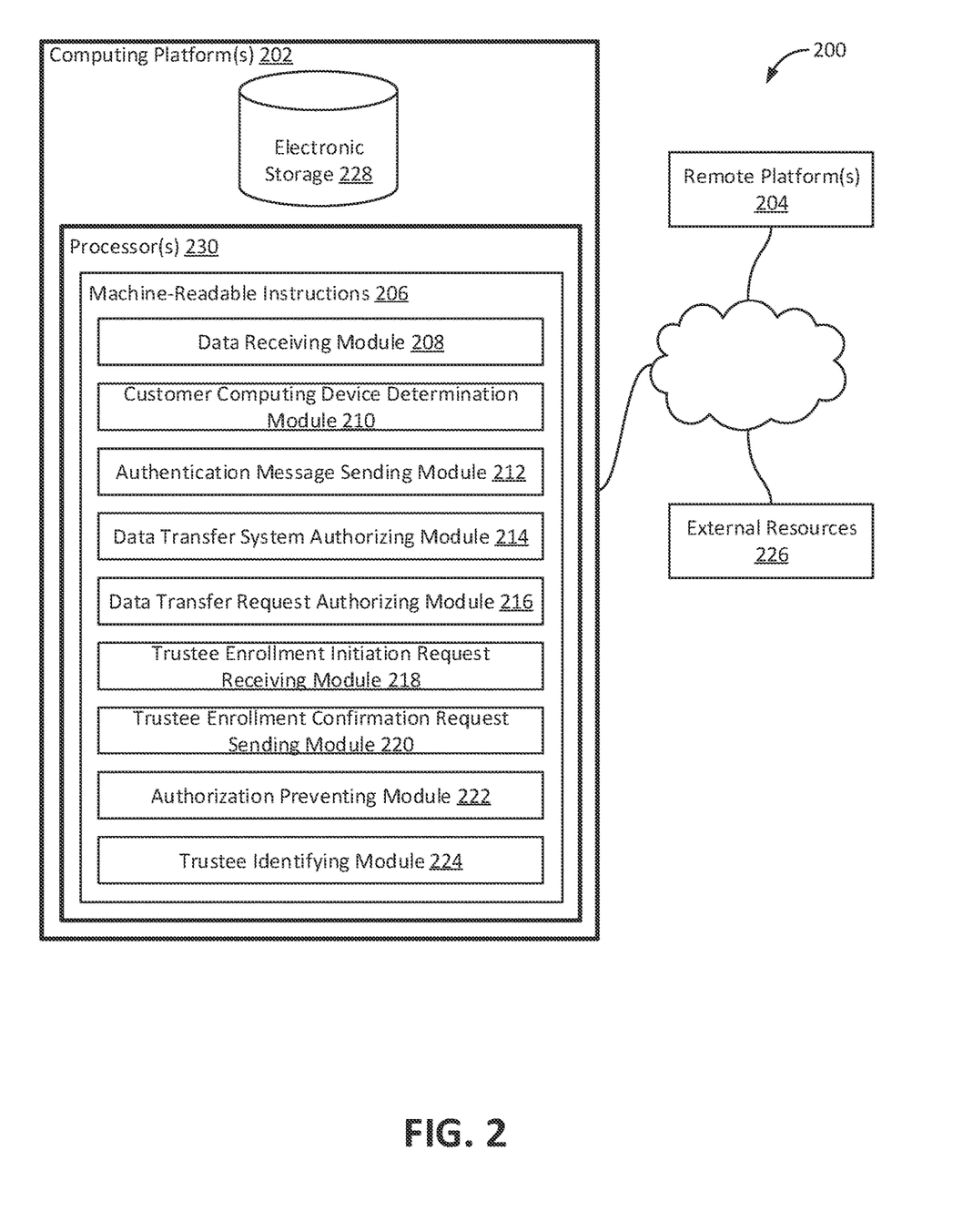
FIG. 2 illustrates another system configured for authorizing or processing instructions associated with one or more data transfers, in accordance with one or more embodiments.

FIG. 2 illustrates another system 200, such as a system of trust 130 as shown in FIG. 1, configured for processing instructions associated with one or more data transfers, in accordance with one or more embodiments. In some embodiments, system 200 may include one or more computing platforms 202. In an example embodiment, the system of trust 130 comprises the computing platform(s) 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of data receiving module 208, customer computing device determination module 210, authentication message sending module 212, data transfer system authorizing module 214, data transfer request authorizing module 216, trustee enrollment initiation request receiving module 218, trustee enrollment confirmation request sending module 220, authorization preventing module 222, trustee identifying module 224, and/or other instruction modules.

Data receiving module 208 may be configured to receive, from a data transfer system, a data transfer authorization request. The data transfer authorization request is based on a data transfer initiated by a customer computing device associated with a customer. In an implementation in which a system of trust is integrated with a data transfer system, the data transfer authorization request may be received from a customer computing device associated with a customer. The data transfer request may include data transfer instructions associated with the data transfer. Receiving the data transfer request may be performed by a data transfer system, such as a banking system apparatus, outside of the system of trust. The system of trust may receive, from the data transfer system, a data transfer authorization request, the data transfer authorization request being based on a data transfer initiated by a customer computing device associated with a customer.

Customer computing device determination module 210 may be configured to determine whether the customer computing device is associated with a system of trust defining a trust relationship between the customer and one or more trustees. In an embodiment, determining whether the customer computing device is associated with the system of trust is performed by the data transfer system, for example a banking system apparatus, outside of the system of trust. In another embodiment, determining whether the customer computing device is associated with the system of trust is performed by an apparatus within the system of trust.

Authentication message sending module 212 may be configured to, when the customer computing device is associated with the system of trust, send a third-party second-factor authentication message to one or more trustee computing devices associated with the one or more trustees without sending any message to the customer computing device. Sending the third-party second-factor authentication message may be performed by an apparatus within the system of trust.

Authentication message sending module 212 may be configured to, when the customer computing device is not associated with the system of trust, send a first-party second-factor authentication message to the customer computing device.

Authentication message sending module 212 may be configured to send the third-party second-factor authentication message to a plurality of trustee computing devices. Each of the plurality of trustee computing devices may be associated with a unique one of the one or more trustees.

Data transfer system authorizing module 214 may be configured to, when the customer computing device is associated with the system of trust, authorize the data transfer system to complete the data transfer request in response to receipt of a third-party authentication confirmation from the one or more trustee computing devices and in the absence of any authentication confirmation from the customer computing device. Authorizing the data transfer system to complete the data transfer request may be performed by an apparatus within the system of trust.

Data transfer system authorizing module 214 may be configured to, when the customer computing device is not associated with the system of trust, authorize the data transfer system to complete the data transfer request in response to receipt of a first-party authentication confirmation from the customer computing device.

Data transfer request authorizing module 216 may be configured to authorize the data transfer request in response to receipt of a separate third-party second-factor authentication confirmation from each of a plurality of trustee computing devices, in a case where such authorization is required.

Trustee enrollment initiation request receiving module 218 may be configured to, prior to receiving the data transfer request, receiving, at the apparatus and from the customer computing device, a trustee enrollment initiation request identifying the one or more trustees to be enrolled in the trust relationship with the customer computing device.

Trustee enrollment confirmation request sending module 220 may be configured to, prior to receiving the data transfer request, send, from the apparatus, a trustee enrollment confirmation request to the one or more trustee computing devices associated with the one or more trustees.

Authorization preventing module 222 may be configured to prevent authorization of the data transfer request in the absence of receipt of the third-party second-factor authentication confirmation and in response to the determination that the customer computing device is associated with the system of trust.

Trustee identifying module 224 may be configured to identify, by an apparatus within the system of trust, the one or more trustees.

In some embodiments, computing platform(s) 202, remote platform(s) 204, and/or external resources 226 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 226 may be operatively linked via some other communication media.

A given remote platform 204 may include one or more processors configured to execute computer program modules. The computer program modules may be configured to enable an expert or user associated with the given remote platform 204 to interface with system 200 and/or external resources 226, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 226 may include sources of information outside of system 200, external entities participating with system 200, and/or other resources. In some embodiments, some or all of the functionality attributed herein to external resources 226 may be provided by resources included in system 200.

Computing platform(s) 202 may include electronic storage 228, one or more processors 230, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 228 may comprise non-transitory storage media that electronically stores information. The electronic storage media of electronic storage 228 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 228 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 228 may include one or more virtual storage resources (e.g., cloud storage, a virtual private network, and/or other virtual storage resources). Electronic storage 228 may store software algorithms, information determined by processor(s) 230, information received from computing platform(s) 202, information received from remote platform(s) 204, and/or other information that enables computing platform(s) 202 to function as described herein.

Processor(s) 230 may be configured to provide information processing capabilities in computing platform(s) 202. As such, processor(s) 230 may include one or more of a digital processor, an analog processor, a digital circuit designed to process information, an analog circuit designed to process information, a state machine, and/or other mechanisms for electronically processing information. Although processor(s) 230 is shown in FIG. 2 as a single entity, this is for illustrative purposes only. In some embodiments, processor(s) 230 may include a plurality of processing units. These processing units may be physically located within the same device, or processor(s) 230 may represent processing functionality of a plurality of devices operating in coordination. Processor(s) 230 may be configured to execute modules 208, 210, 212, 214, 216, 218, 220, 222, and/or 224, and/or other modules. Processor(s) 230 may be configured to execute modules 208, 210, 212, 214, 216, 218, 220, 222, and/or 224, and/or other modules by software; hardware; firmware; some combination of software, hardware, and/or firmware; and/or other mechanisms for configuring processing capabilities on processor(s) 230. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, and/or 224 are illustrated in FIG. 2 as being implemented within a single processing unit, in embodiments in which processor(s) 230 includes multiple processing units, one or more of modules 208, 210, 212, 214, 216, 218, 220, 222, and/or 224 may be implemented remotely from the other modules. The description of the functionality provided by the different modules 208, 210, 212, 214, 216, 218, 220, 222, and/or 224 described below is for illustrative purposes, and is not intended to be limiting, as any of modules 208, 210, 212, 214, 216, 218, 220, 222, and/or 224 may provide more or less functionality than is described. For example, one or more of modules 208, 210, 212, 214, 216, 218, 220, 222, and/or 224 may be eliminated, and some or all of its functionality may be provided by other ones of modules 208, 210, 212, 214, 216, 218, 220, 222, and/or 224. As another example, processor(s) 230 may be configured to execute one or more additional modules that may perform some or all of the functionality attributed below to one of modules 208, 210, 212, 214, 216, 218, 220, 222, and/or 224.

Figure 3:
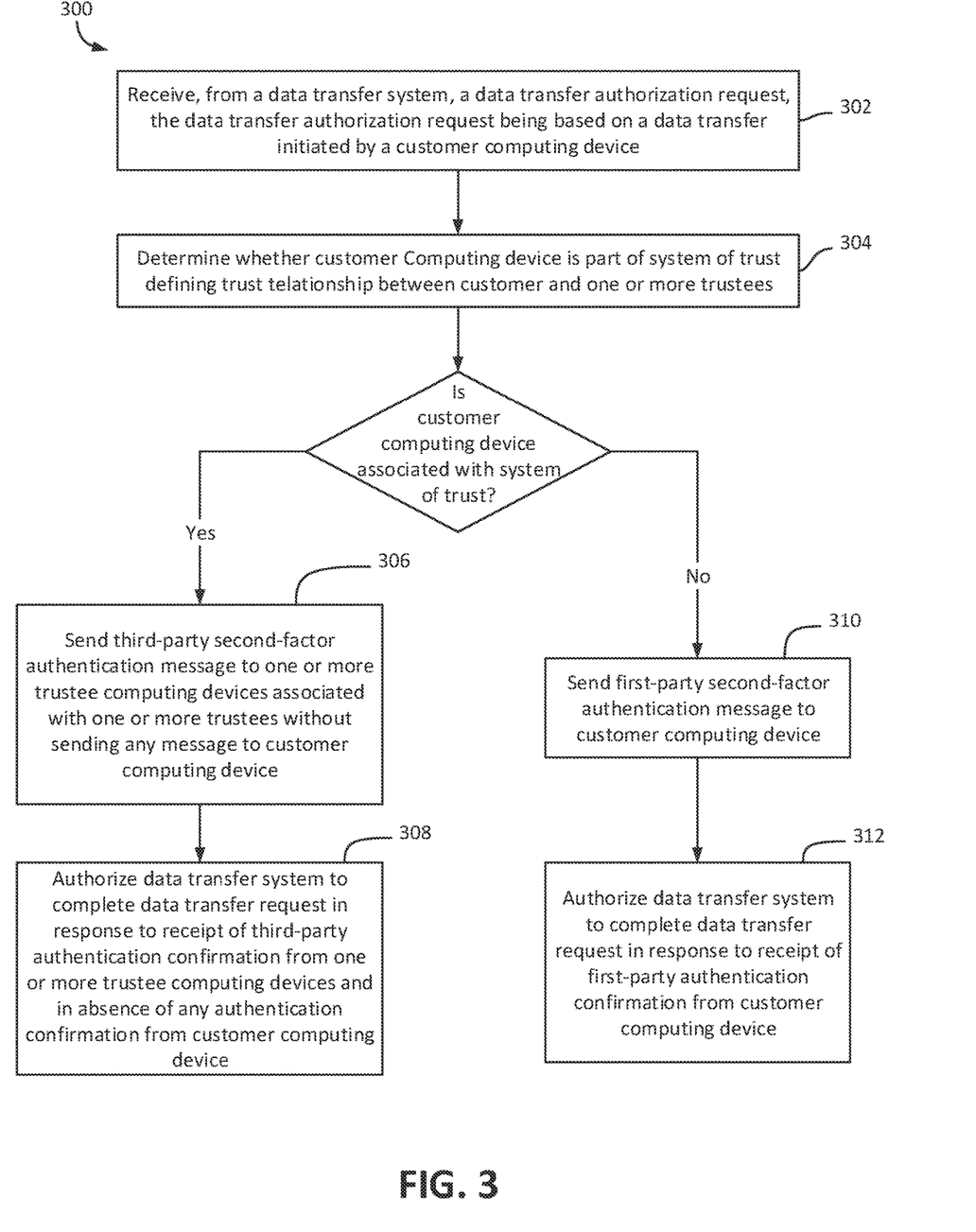
FIG. 3 illustrates a method for authorizing or processing instructions associated with one or more data transfers, in accordance with one or more embodiments.

FIG. 3 illustrates a method 300 for processing instructions associated with one or more data transfers, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving, from a data transfer system, a data transfer authorization request, the data transfer authorization request being based on a data transfer initiated by a customer computing device associated with a customer. Operation 302 may be performed by one or more hardware processors configured by machine-readable instructions including a module that is the same as or similar to data receiving module 208, in accordance with one or more embodiments.

An operation 304 may include determining whether the customer computing device is associated with a system of trust defining a trust relationship between the customer and one or more trustees. Operation 304 may be performed by one or more hardware processors configured by machine-readable instructions including a module that is the same as or similar to customer computing device determination module 210, in accordance with one or more embodiments.

An operation 306 may include, when the customer computing device is associated with the system of trust, sending a third-party second-factor authentication message to one or more trustee computing devices associated with the one or more trustees without sending any message to the customer computing device. Operation 306 may be performed by one or more hardware processors configured by machine-readable instructions including a module that is the same as or similar to authentication message sending module 212, in accordance with one or more embodiments.

Operation 306 may be selectively enabled or disabled in certain cases, for example in response to a set of rules established by the customer, or by the data transfer system. In one example, a customer with reduced capacity always has the third-party second-factor authentication turned on, optionally not even allowing the second-factor authentication to be performed by the customer and only allowing the authentication to be performed by a trustee. In another example, a capable customer may enable a rule to only turn on the third-party second-factor authentication when the customer is not available for second-factor authentication, such as before a period of time in which the customer will be traveling and foresees being potentially unavailable for second-factor authentication.

An operation 308 may include, when the customer computing device is associated with the system of trust, authorizing a data transfer system to complete the data transfer request in response to receipt of a third-party authentication confirmation from the one or more trustee computing devices and in the absence of any authentication confirmation from the customer computing device. Operation 308 may be performed by one or more hardware processors configured by machine-readable instructions including a module that is the same as or similar to data transfer system authorizing module 214, in accordance with one or more embodiments.

An operation 310 may include, when the customer computing device is not associated with the system of trust, sending a first-party second-factor authentication message to the customer computing device. Operation 310 may be performed by one or more hardware processors configured by machine-readable instructions including a module that is the same as or similar to authentication message sending module 212, in accordance with one or more embodiments.

An operation 312 may include, when the customer computing device is not associated with the system of trust, authorizing the data transfer system to complete the data transfer request in response to receipt of a first-party authentication confirmation from the customer computing device. Operation 312 may be performed by one or more hardware processors configured by machine-readable instructions including a module that is the same as or similar to data transfer system authorizing module 214, in accordance with one or more embodiments.

Figure 4:
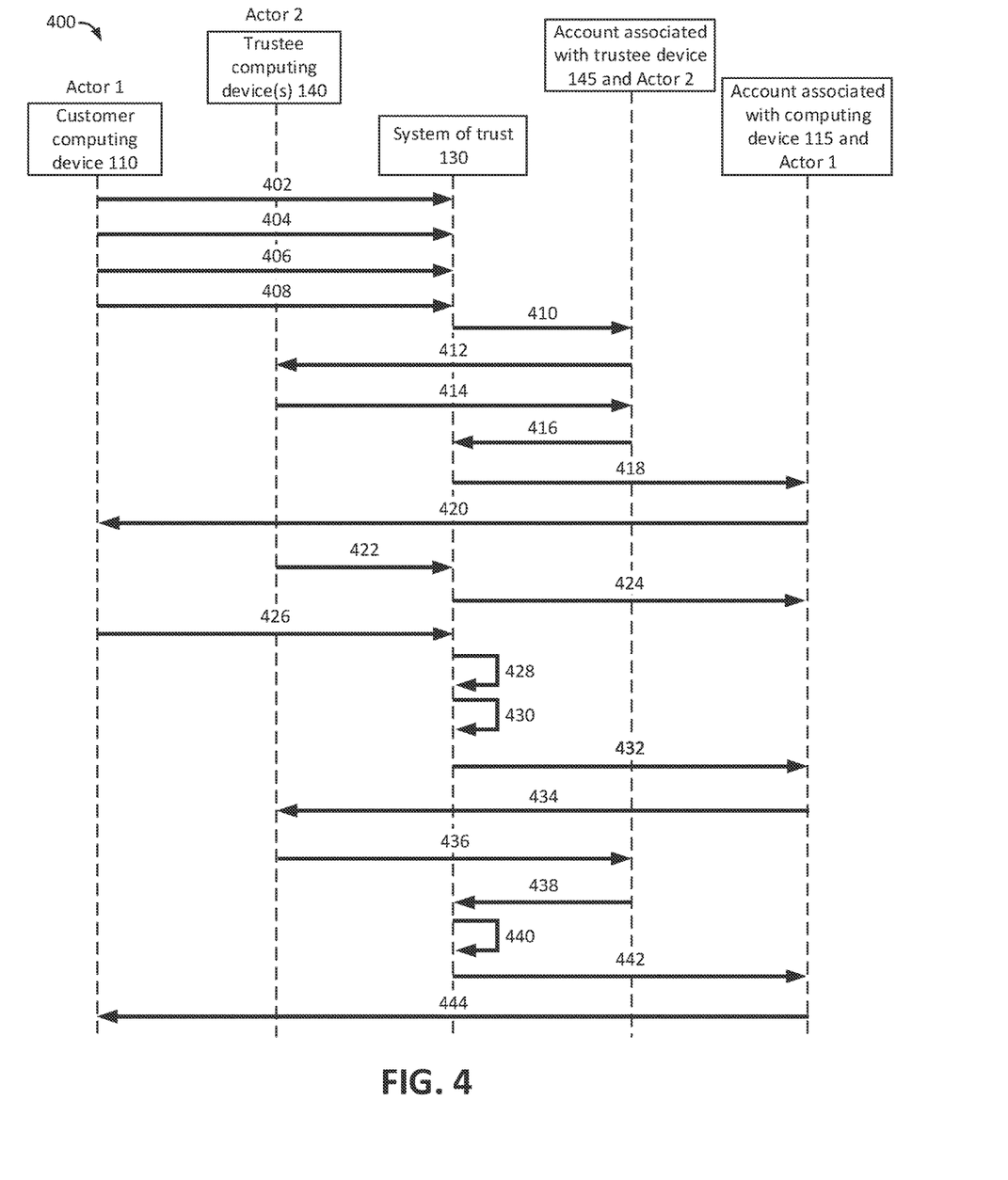
FIG. 4 illustrates another method for authorizing or processing instructions associated with one or more data transfers, in accordance with one or more embodiments.

FIG. 4 illustrates another method for authorizing or processing instructions associated with one or more data transfers, in accordance with one or more embodiments. The method is described in relation to a computing device 110 and an account 115 associated with the computing device, one or more trustee computing devices 140 and an account 145 associated with the trustee computing device, as well as the system of trust 130.

FIG. 4 can be described as a sequence diagram illustrating steps in a method of processing instructions associated with one or more data transfers, such as transactions. In the detailed discussion below, the method is described as being performed in relation to the system of trust 130, a device and account associated with Actor 1 (e.g. the customer computing device 110 and associated account 115) and a device and account associated with Actor 2 (e.g. the trustee computing device 140, and the account 145 associated with the trustee). In an implementation, Actor 1 is a customer, and Actor 2 is a person designated by Actor 1 as a trusted person, or belonging to a network of trust or a system of trust with respect to Actor 1. References to Actor 1 and Actor 2 are understood to also refer to a device used by Actor 1 or Actor 2, respectively.

At sequence 402, Actor 1 submits a login request to the system of trust 130. At sequence 404, Actor 1 sends a request to register with the system of trust. At sequence 406, Actor 1 defines one or more acceptable second factor authentications, or modes/methods of second factor authentication.

At sequence 408, Actor 1 registers, or sends one or more requests to register, one or more trust partners, e.g. including Actor 2. The trust partners can be third party customers or non-customers, with respect to the data transfer system, who can verify the identity of Actor 1.

Sequences 410-414 relate to Actor 2 agreeing to be a third party in a trust relationship with respect to Actor 1. In sequence 410, the system of trust sends a message or notification to a device or account associated with Actor 2, which are conveyed to Actor 2 in sequence 412, for example using a display or other means of audio, visual and/or tactile interaction/feedback. Actor 2 then responds or provides consent, in sequence 414, to the request to be added as a trust partner with respect to Actor 1. In sequence 416, this agreement or acknowledgment is conveyed to the system of trust 130.

In sequence 418, the system of trust 130 provides a notification to a device associated with Actor 1, confirming that Actor 2 has consented to being a trusted person and has accepted a request to vouch for Actor 1. The notification can include displaying a message on Actor 1's device or sending a notification to an email account or other account associated with Actor 1. In sequence 420, Actor 1 sees the notification, for example in a banking account, email account, device SMS window, push notification to a mobile banking app, or other app.

In sequence 422, Actor 2 optionally notifies Actor 1 that he/she has accepted the trust request, for example by sending a notification to the system of trust. The system of trust then, in sequence 424, conveys a suitable notification to Actor 1's device or account.

So far, sequences 402-424 relate to the establishment and setup of a network of trust, or system of trust. These sequences or steps can be repeated for any number of trusted persons that Actor 1 wishes to add to their network of trust.

Sequence 426 begins a process by which Actor 1 decides to perform a data transfer in relation to which the data transfer system will use the system of trust to perform verification or authentication. In sequence 426, Actor 1 sends a data transfer request, such as a money transfer request. In response to Actor 1 sending the data transfer request, the data transfer system may determine that it is necessary to step up authentication, for example based on a policy, to verify that Actor 1 is who they say they are. In an implementation in which the data transfer is a transaction, this may involve a bank using third parties (e.g. Actor 2, or Actor 3 or Actor 4) to verify Actor 1, to make sure the transaction being requested/performed can be verified.

In sequence 428, a level of assurance associated with the data transfer is determined, for example by or based on information stored at or associated with one or more of: the data transfer system; the system of trust; and/or the customer. The determination of the level of assurance may be based on the nature and velocity of the underlying data transfer, the device threat metrics, and optionally other factors, for example in the case of a transaction the amounts associated with the transaction. In sequence 430, the data transfer system or system of trust looks up any registered trusted people associated with Actor 1. At this point, Actor 2 has been registered, but other actors could be registered too. Depending upon who responds first, it might be Actor 2, Actor 3, Actor 4 etc. that may respond to assist in verifications. For example, this system could be used with respect to elderly customers to protect that portion of the population that is most exposed to fraudsters.

In sequence 432, the system of trust initiates a process of second factor authentication by advising an account associated with Actor 1, which then sends a notification in sequence 434 to a device associated with Actor 2. Alternatively, this sequence may include sending a message to a device associated with Actor 2 (or any other person in Actor 1's network of trust), to verify Actor 1 with respect to the transaction request, without first notifying Actor 1. This can be done using any suitable means, such as SMS One Time Code (OTC), Push OTC, Facebook Messenger, notification within a banking app, etc. In sequence 434, the notification is conveyed to Actor 2's device.

In sequence 436, Actor 2 provides an authorization to allow the data transfer to go through, for example after having reviewed provided parameters associated with the data transfer or transaction. In step 438, a message or notification is sent from Actor 2's account/device to the system of trust 130. In an implementation, depending on the nature of the data transfer, for example the nature of a transaction and the amount, a rule may require waiting on authorization from a plurality of trustees such as Actor 2, Actor 3, etc. to provide an accumulation of trust.

In sequence 440, after determining that the received authorization(s) meet(s) criteria associated with the data transfer request, the system of trust authorizes the data transfer to go through. In an embodiment, this authorization includes sending a notification or authorization message to the data transfer system responsible for performing the data transfer. In sequence 442, the system of trust sends a message or notification to an account associated with Actor 1 to let them know that the data transfer request has been allowed, based on successful authorization via the system of trust. In sequence 444, Actor 1 sees the message or notification via their device or account that Actor 2, Actor 3, etc. have allowed the transaction to go through.

While the above description in relation to FIG. 4 outlines one specific example implementation, other example implementations may include one or more of the following. In an example embodiment, instead of the Actors being individuals, one or more of the actors may be a branch of a financial institution, a contact center, family or friends, or a "trusted" lawyer or other professional, or designated person such as a power of attorney. The device may be a browser app on a desktop, a mobile app, or a wearable device such as a watch, a necklace based device, etc. The push may be web based push, SMS, email, Apple Push Notification, Google Push Notification, etc. The verification method may be a one-time-passcode, and for example could be digit based or alphanumeric.

Figure 5:
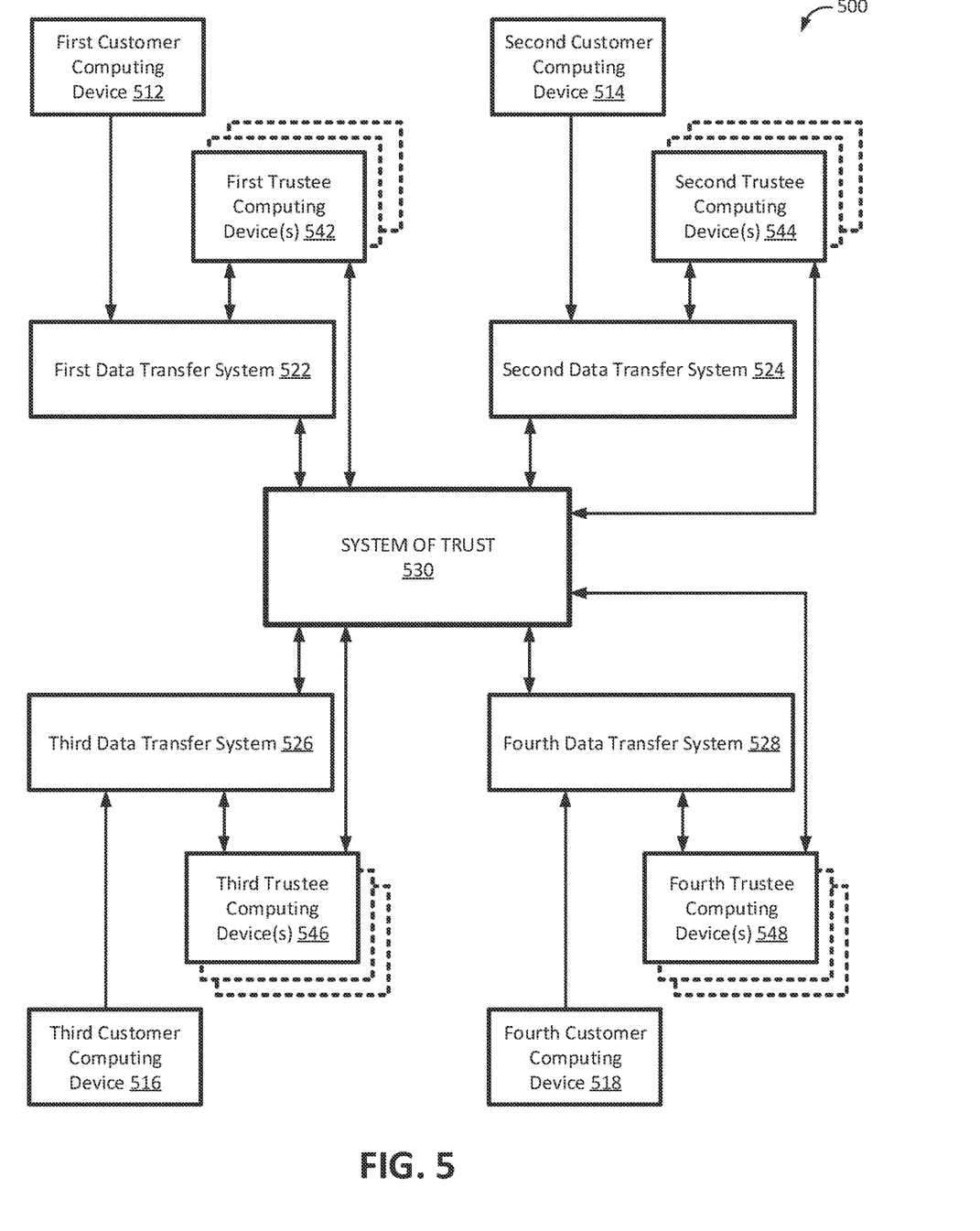
FIG. 5 illustrates a further system configured for authorizing or processing instructions associated with one or more data transfers, in accordance with one or more embodiments.

FIG. 5 illustrates a further system 500 configured for authorizing or processing instructions associated with one or more data transfers, in accordance with one or more embodiments. The embodiment of FIG. 5 is similar to the embodiment of FIG. 1, and shows a system of trust 530 in communication with a plurality of data transfer systems. For example, a first data transfer system 522 is in communication with the system of trust 530 and configured to receive a first data transfer request from a first computing device 512 and to coordinate authorization of the first data transfer request with one or more first trustee computing devices 542. Similarly: a second data transfer system 524 is in communication with the system of trust 530 and configured to receive a second data transfer request from a second computing device 514 and to coordinate authorization of the second data transfer request with one or more second trustee computing devices 544; a third data transfer system 526 is in communication with the system of trust 530 and configured to receive a third data transfer request from a third computing device 516 and to coordinate authorization of the third data transfer request with one or more third trustee computing devices 546; and a fourth data transfer system 528 is in communication with the system of trust 530 and configured to receive a fourth data transfer request from a fourth computing device 518 and to coordinate authorization of the fourth data transfer request with one or more fourth trustee computing devices 548.

In an implementation, the system of trust 530 further comprises a platform providing a dashboard to log in to a website/mobile app and provide functionality. The system of trust may include a repository of types of transactions that are allowed. For example, the system may define/describe what a customer or trustee can and cannot view, for example that they can view a credit card balance but not the card number.

In a situation in which different companies perform or are involved in a data transfer or transaction, the entities may obtain a shared set of rules from a memory in the system of trust 530. In an example embodiment, different parties can participate in the system of trust, and predefined rules may apply to the different parties and identify permissions/authorization to proceed. In one example, the same rules apply to each of the plurality of data transfer systems. In another example, the system of trust stores a plurality of sets of rules, with each set of rules applying to at least one of the plurality of data transfer systems.

This approach centralizes the protection in one area, in other words in the system of trust 530, between different institutions/parties. In an implementation, the system of trust is configured to define: a) what a customer or trustee is permitted to see and do; and b) whether there is an authorization allowed for any of the activities.

Embodiments of the present disclosure may provide a layer of protection for the parties involved, using the system of trust 530, such that participating parties will be on alert, or provided with a notification, if something out of the ordinary happens. In an aspect of protection, the system of trust 530 is configured to provide a holistic view of what is happening across a plurality of data transfer systems, which may span industries. Using a system of trust, the same level of protection may be provided to all of the participating parties, or participating data transfer systems, to prevent a malicious actor from contacting a party and trying to spoof different systems, because each data transfer system is participating in the centralized system of trust. This can provide an advantage compared to known approaches according to which each data transfer system may have different levels of protection, and a particular data transfer system having a lower level of protection may be a weak link or source of vulnerability in a network or ecosystem in which the data transfer system with the lower level of protection is accessible by and in communication with other data transfer systems with higher levels of protection.

In further implementations, the customer and trustees may be individuals or corporate entities, organizations, governments, etc. In another implementation, the system of trust may be configured to contribute to building a web of trust, e.g. with complex contracts at a data transfer system, such as a financial institution, that provides a level of assurance that all the right people are signing this from various companies.

In an implementation, the system of trust comprises a network of a few participants and a memory storing set of rules applicable to one or more types of transactions that are permitted/refused, and optionally a hierarchy of participants. The system of trust may define a network of trust for each of a plurality of customers. The system of trust may define a network of trust for one or more computing devices associated with each of a plurality of customers.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following CLAUSES, with specific features laid out in the dependent clauses:

One aspect of the present disclosure relates to a system or apparatus configured for processing instructions associated with one or more data transfers. The apparatus may comprise a non-transient computer-readable storage medium having executable instructions embodied thereon, and one or more hardware processors. The processor(s) may be configured to receive, from a customer device associated with a customer, a data transfer request including data transfer instructions associated with the data transfer. The processor(s) may be configured to initiate, by the apparatus, a third-party second-factor authentication process to authenticate the customer device in response to a determination that the customer device is part of a system of trust defining a trust relationship between the customer and one or more trustees. The processor(s) may be configured to send, by the apparatus and on behalf of the system of trust, a third-party second-factor authentication message to one or more trustee devices associated with the one or more trustees without sending any message to the customer device. The processor(s) may be configured to authorize the data transfer system to complete the data transfer request in response to receipt of a third-party second-factor authentication confirmation from the one or more trustee devices and in the absence of any authentication confirmation from the customer device.

In some implementations of the apparatus, the processor(s) may be configured to send the third-party second-factor authentication message to a plurality of trustee devices, each of the plurality of trustee devices associated with a unique one of the one or more trustees; and authorize the data transfer request in response to receipt of a separate third-party second-factor authentication confirmation from each of the plurality of trustee devices.

In some implementations of the apparatus, the processor(s) may be configured to receive, from the customer device, a trustee enrollment initiation request identifying the one or more trustees to be enrolled in the trust relationship with the customer device; and send, from the apparatus, a trustee enrollment confirmation request to the one or more trustee devices associated with the one or more trustees.

In some implementations of the apparatus, the processor(s) may be configured to prevent authorization of the data transfer request in the absence of receipt of the third-party second-factor authentication confirmation and in response to the determination that the customer device is part of the system of trust.

Another aspect of the present disclosure relates to a system or apparatus configured for processing instructions associated with one or more data transfers. The apparatus may comprise a non-transient computer-readable storage medium having executable instructions embodied thereon, and one or more hardware processors. The processor(s) may be configured to receive, from a customer device associated with a customer, a data transfer request including data transfer instructions associated with the data transfer. The processor(s) may be configured to determine, by the apparatus, whether the customer device is part of a system of trust defining a trust relationship between the customer and one or more trustees. The processor(s) may be configured to, when the customer device is part of the system of trust: send, by the apparatus and on behalf of the system of trust, a third-party second-factor authentication message to one or more trustee devices associated with the one or more trustees without sending any message to the customer device; and authorize the data transfer system to complete the data transfer request in response to receipt of a third-party authentication confirmation from the one or more trustee devices and in the absence of any authentication confirmation from the customer device. The processor(s) may be configured to, when the customer device is not part of the system of trust: send, by the apparatus, a first-party second-factor authentication message to the customer device; and authorize the data transfer system to complete the data transfer request in response to receipt of a first-party authentication confirmation from the customer device.

A further aspect of the present disclosure relates to a system configured for processing instructions associated with one or more data transfers. The system may include one or more hardware processors configured by machine-readable instructions. The processor(s) may be configured to receive, from a data transfer system, a data transfer authorization request, the data transfer authorization request being based on a data transfer initiated by a customer computing device associated with a customer. The processor(s) may be configured to determine whether the customer computing device is associated with the system of trust such that the association defines a trust relationship between the customer and one or more trustees. The processor(s) may be configured to, when the customer computing device is associated with the system of trust, send a third-party second-factor authentication message to one or more trustee computing devices associated with one or more trustees without sending any message to the customer computing device. The processor(s) may be configured to, when the customer computing device is associated with the system of trust, authorize the data transfer system to complete the data transfer request in response to receipt of a third-party authentication confirmation from the one or more trustee computing devices and in the absence of any authentication confirmation from the customer computing device. The processor(s) may be configured to, when the customer computing device is not associated with the system of trust, send a first-party second-factor authentication message to the customer computing device. The processor(s) may be configured to, when the customer computing device is not associated with the system of trust, authorize the data transfer system to complete the data transfer request in response to receipt of a first-party authentication confirmation from the customer computing device.

In some implementations of the system, the processor(s) may be configured to determine whether the customer computing device is associated with the system of trust based on a result from a previous determination that the customer computing device is associated with the system of trust.

In some implementations of the system, the processor(s) may be configured to determine whether the customer computing device is associated with the system of trust by: searching a trust relationship database; and identifying the customer computing device in the trust relationship database.

In some implementations of the system, the processor(s) may be configured to enroll the customer computing device and the one or more trustee devices in the trust relationship using the system of trust so as to define the trust relationship between the customer and one or more trustees.

In some implementations of the system, the processor(s) may be configured to, when the customer computing device is associated with the system of trust: authorize the data transfer system to complete the data transfer request in response to receipt of the third-party authentication confirmation and when the customer device is available to provide authorization.

In some implementations of the system, the processor(s) may be configured to send the third-party second-factor authentication message to a plurality of trustee computing devices. In some implementations of the system, each of the plurality of trustee computing devices may be associated with a unique one of the one or more trustees. In some implementations of the system, the processor(s) may be configured to authorize the data transfer request in response to receipt of a separate third-party second-factor authentication confirmation from each of the plurality of trustee computing devices.

In some implementations of the system, the processor(s) may be configured to, prior to receive the data transfer request, receiving, at the apparatus and from the customer computing device, a trustee enrollment initiation request identifying the one or more trustees to be enrolled in the trust relationship with the customer computing device. In some implementations of the system, the processor(s) may be configured to, prior to receiving the data transfer request, send, from the apparatus, a trustee enrollment confirmation request to the one or more trustee computing devices associated with the one or more trustees.

In some implementations of the system, the processor(s) may be configured to prevent authorization of the data transfer request in the absence of receipt of the third-party second-factor authentication confirmation and in response to the determination that the customer computing device is associated with the system of trust.

In some implementations of the system, the processor(s) may be configured to, when the customer computing device is associated with the system of trust: send the first-party second-factor authentication message to the customer computing device; and authorize the data transfer system to complete the data transfer request in response to receipt of either the third-party second-factor authentication message or the first-party second-factor authentication message, whichever is received first.

In some implementations of the system, the processor(s) may be configured to: receive, from a second data transfer system, a second data transfer authorization request based on a second data transfer initiated by a second customer computing device associated with a second customer; determine whether the second customer computing device is associated with the system of trust such that the association defines a second trust relationship between the second customer and one or more second trustees; send a second third-party second-factor authentication message to one or more second trustee computing devices associated with the one or more second trustees without sending any message to the second customer computing device; and authorize the second data transfer system to complete the second data transfer request in response to receipt of a second third-party authentication confirmation from the one or more second trustee computing devices and in the absence of any authentication confirmation from the second customer computing device; and authorize a first data transfer originating from a first data transfer system and a second data transfer originating from the second data transfer system.

Another aspect of the present disclosure relates to a method for processing instructions associated with one or more data transfers. The method may include receiving, from a data transfer system, a data transfer authorization request, the data transfer authorization request being based on a data transfer initiated by a customer computing device associated with a customer. The method may include determining whether the customer computing device is associated with a system of trust defining a trust relationship between the customer and one or more trustees. The method may include, when the customer computing device is associated with the system of trust, sending a third-party second-factor authentication message to one or more trustee computing devices associated with the one or more trustees without sending any message to the customer computing device. The method may include, when the customer computing device is associated with the system of trust, authorizing a data transfer system to complete the data transfer request in response to receipt of a third-party authentication confirmation from the one or more trustee computing devices and in the absence of any authentication confirmation from the customer computing device. The method may include, when the customer computing device is not associated with the system of trust, sending a first-party second-factor authentication message to the customer computing device. The method may include, when the customer computing device is not associated with the system of trust, authorizing the data transfer system to complete the data transfer request in response to receipt of a first-party authentication confirmation from the customer computing device.

In some implementations of the method, determining whether the customer computing device is associated with the system of trust may be based on a result from a previous determination that the customer computing device is associated with the system of trust.

In some implementations of the method, determining whether the customer computing device is associated with the system of trust may include: searching a trust relationship database; and identifying the customer computing device in the trust relationship database.

In some implementations of the method, it may include: enrolling the customer computing device and the one or more trustee devices in the trust relationship using the system of trust so as to define the trust relationship between the customer and one or more trustees.

In some implementations of the method, it may include, when the customer computing device is associated with the system of trust: authorizing the data transfer system to complete the data transfer request in response to receipt of the third-party authentication confirmation and when the customer device is available to provide authorization.

In some implementations of the method, it may include sending the third-party second-factor authentication message to a plurality of trustee computing devices. In some implementations of the method, each of the plurality of trustee computing devices may be associated with a unique one of the one or more trustees. In some implementations of the method, it may include authorizing the data transfer request in response to receipt of a separate third-party second-factor authentication confirmation from each of the plurality of trustee computing devices.

In some implementations of the method, it may include, prior to receiving the data transfer request, receiving, at the apparatus and from the customer computing device, a trustee enrollment initiation request identifying the one or more trustees to be enrolled in the trust relationship with the customer computing device. In some implementations of the method, it may include, prior to receiving the data transfer request, sending, from the apparatus, a trustee enrollment confirmation request to the one or more trustee computing devices associated with the one or more trustees.

In some implementations of the method, it may include preventing authorization of the data transfer request in the absence of receipt of the third-party second-factor authentication confirmation and in response to the determination that the customer computing device is associated with the system of trust.

In some implementations of the method, it may include, when the customer computing device is associated with the system of trust: sending the first-party second-factor authentication message to the customer computing device; and authorizing the data transfer system to complete the data transfer request in response to receipt of either the third-party second-factor authentication message or the first-party second-factor authentication message, whichever is received first.

Yet another aspect of the present disclosure relates to a non-transient computer-readable storage medium having instructions embodied thereon, the instructions being executable by one or more processors to perform a method for processing instructions associated with one or more data transfers. The method may include receiving, from a data transfer system, a data transfer authorization request, the data transfer authorization request being based on a data transfer initiated by a customer computing device associated with a customer. The method may include determining whether the customer computing device is associated with a system of trust such that the association defines a trust relationship between the customer and one or more trustees. The method may include, when the customer computing device is associated with the system of trust, sending a third-party second-factor authentication message to one or more trustee computing devices associated with the one or more trustees without sending any message to the customer computing device. The method may include, when the customer computing device is associated with the system of trust, authorizing a data transfer system to complete the data transfer request in response to receipt of a third-party authentication confirmation from the one or more trustee computing devices and in the absence of any authentication confirmation from the customer computing device. The method may include, when the customer computing device is not associated with the system of trust, sending a first-party second-factor authentication message to the customer computing device. The method may include, when the customer computing device is not associated with the system of trust, authorizing the data transfer system to complete the data transfer request in response to receipt of a first-party authentication confirmation from the customer computing device.

Still another aspect of the present disclosure relates to a system configured for processing instructions associated with one or more data transfers. The system may include means for receiving, from a data transfer system, a data transfer authorization request, the data transfer authorization request being based on a data transfer initiated by a customer computing device associated with a customer. The system may include means for determining whether the customer computing device is associated with a system of trust such that the association defines a trust relationship between the customer and one or more trustees. The system may include means for, when the customer computing device is associated with the system of trust, sending a third-party second-factor authentication message to one or more trustee computing devices associated with the one or more trustees without sending any message to the customer computing device. The system may include means for, when the customer computing device is associated with the system of trust, authorizing a data transfer system to complete the data transfer request in response to receipt of a third-party authentication confirmation from the one or more trustee computing devices and in the absence of any authentication confirmation from the customer computing device. The system may include means for, when the customer computing device is not associated with the system of trust, sending a first-party second-factor authentication message to the customer computing device. The system may include means for, when the customer computing device is not associated with the system of trust, authorizing the data transfer system to complete the data transfer request in response to receipt of a first-party authentication confirmation from the customer computing device.

Even another aspect of the present disclosure relates to a computing platform configured for processing instructions associated with one or more data transfers. The computing platform may include a non-transient computer-readable storage medium having executable instructions embodied thereon. The computing platform may include one or more hardware processors configured to execute the instructions. The processor(s) may execute the instructions to receive, from a data transfer system, a data transfer authorization request, the data transfer authorization request being based on a data transfer initiated by a customer computing device associated with a customer. The processor(s) may execute the instructions to determine whether the customer computing device is associated with a system of trust such that the association defines a trust relationship between the customer and one or more trustees. The processor(s) may execute the instructions to, when the customer computing device is associated with the system of trust, send a third-party second-factor authentication message to one or more trustee computing devices associated with the one or more trustees without sending any message to the customer computing device. The processor(s) may execute the instructions to, when the customer computing device is associated with the system of trust, authorize the data transfer system to complete the data transfer request in response to receipt of a third-party authentication confirmation from the one or more trustee computing devices and in the absence of any authentication confirmation from the customer computing device. The processor(s) may execute the instructions to, when the customer computing device is not associated with the system of trust, send a first-party second-factor authentication message to the customer computing device. The processor(s) may execute the instructions to, when the customer computing device is not associated with the system of trust, authorize the data transfer system to complete the data transfer request in response to receipt of a first-party authentication confirmation from the customer computing device.

The invention claimed is:

1. A system of trust configured for authorizing one or more data transfers, the comprising:
    a non-transient computer-readable storage medium having executable instructions embodied thereon; and
    one or more hardware processors configured to execute the instructions to:
        receive, from a data transfer system, a data transfer authorization request, the data transfer authorization request being based on a data transfer initiated by a customer computing device associated with a customer;
        determine that the customer computing device is associated enrolled with a system of trust such that the association, where enrollment with the system of trust defines a trust relationship between the customer computing device and one or more trustees trustee computing devices;
        when the customer computing device is enrolled with the system of trust:
            send a third-party second-factor authentication message to one or more trustee computing devices associated with one or more trustees without sending any message to the customer computing device; and
            authorize the data transfer system to complete the data transfer request in response to receipt of a third-party authentication confirmation from the one or more trustee computing devices and in the absence of any authentication confirmation from the customer computing device.

2. The system of claim 1, wherein the one or more hardware processors are further configured by the instructions to, when the customer computing device is not associated with the system of trust:
    send a first-party second-factor authentication message to the customer computing device; and
    authorize the data transfer system to complete the data transfer request in response to receipt of a first-party authentication confirmation from the customer computing device.

3. The system of claim 1, wherein the one or more hardware processors are further configured by the instructions to:
    determine whether the customer computing device is associated with the system of trust by:
        searching a trust relationship database; and
        identifying the customer computing device in the trust relationship database.

4. The system of claim 1, wherein the one or more hardware processors are further configured by the instructions to:
    enroll the customer computing device and the one or more trustee devices in the trust relationship using the system of trust so as to define the trust relationship between the customer and one or more trustees.

5. The system of claim 1, wherein the one or more hardware processors are further configured by the instructions to, when the customer computing device is associated with the system of trust:
    authorize the data transfer system to complete the data transfer request in response to receipt of the third-party authentication confirmation and when the customer device is available to provide authorization.

6. The system of claim 1, wherein the one or more hardware processors are further configured by the instructions to:
    send the third-party second-factor authentication message to a plurality of trustee computing devices, each of the plurality of trustee computing devices associated with a unique one of the one or more trustees; and
    authorize the data transfer request in response to receipt of a separate third-party second-factor authentication confirmation from each of the plurality of trustee computing devices.

7. The system of claim 1, wherein the one or more hardware processors are further configured by the instructions to:
    prior to receiving the data transfer request, receive, from the customer computing device, a trustee enrollment initiation request identifying the one or more trustees to be enrolled in the trust relationship with the customer computing device;
    prior to receiving the data transfer request, send, from the apparatus, a trustee enrollment confirmation request to the one or more trustee computing devices associated with the one or more trustees.

8. The system of claim 1, wherein the one or more hardware processors are further configured by the instructions to:
    prevent authorization of the data transfer request in the absence of receipt of the third-party second-factor authentication confirmation and in response to the determination that the customer computing device is associated with the system of trust.

9. The system of claim 1, wherein the one or more hardware processors are further configured by the instructions to, when the customer computing device is associated with the system of trust:
    send the first-party second-factor authentication message to the customer computing device; and
    authorize the data transfer system to complete the data transfer request in response to receipt of either the third-party second-factor authentication message or the first-party second-factor authentication message, whichever is received first.

10. The system of claim 1, wherein the one or more hardware processors are further configured by the instructions to:
    receive, from a second data transfer system, a second data transfer authorization request based on a second data transfer initiated by a second customer computing device associated with a second customer;
    determine whether the second customer computing device is associated with the system of trust such that the association defines a second trust relationship between the second customer and one or more second trustees;

send a second third-party second-factor authentication message to one or more second trustee computing devices associated with the one or more second trustees without sending any message to the second customer computing device; and authorize the second data transfer system to complete the second data transfer request in response to receipt of a second third-party authentication confirmation from the one or more second trustee computing devices and in the absence of any authentication confirmation from the second customer computing device; and authorize a first data transfer originating from a first data transfer system and a second data transfer originating from the second data transfer system.

11. A computer-implemented method of authorizing one or more data transfers, the method comprising:

receiving, from a data transfer system, a data transfer authorization request, the data transfer authorization request being based on a data transfer initiated by a customer computing device associated with a customer;

determining that the customer computing device is enrolled with a system of trust, where enrollment with the system of trust defines a trust relationship between the customer computing device and one or more trustee computing devices;

when the customer computing device is enrolled with the system of trust:

sending a third-party second-factor authentication message to the one or more trustee computing devices associated with one or more trustees without sending any message to the customer computing device; and authorizing the data transfer system to complete the data transfer request in response to receipt of a third-party authentication confirmation from the one or more trustee computing devices and in the absence of any authentication confirmation from the customer computing device.

12. The method of claim 11, further comprising, when the customer computing device is not associated with the system of trust:

sending a first-party second-factor authentication message to the customer computing device; and authorizing the data transfer system to complete the data transfer request in response to receipt of a first-party authentication confirmation from the customer computing device.

13. The method of claim 11, wherein determining whether the customer computing device is associated with the system of trust further comprises:

searching a trust relationship database; and identifying the customer computing device in the trust relationship database.

14. The method of claim 11, further comprising:

enrolling the customer computing device and the one or more trustee devices in the trust relationship using the system of trust so as to define the trust relationship between the customer and one or more trustees.

15. The method of claim 11, further comprising, when the customer computing device is associated with the system of trust:

authorizing the data transfer system to complete the data transfer request in response to receipt of the third-party authentication confirmation and when the customer device is available to provide authorization.

16. The method of claim 11, further comprising:

sending the third-party second-factor authentication message to a plurality of trustee computing devices, each of the plurality of trustee computing devices associated with a unique one of the one or more trustees; and authorizing the data transfer request in response to receipt of a separate third-party second-factor authentication confirmation from each of the plurality of trustee computing devices.

17. The method of claim 11, further comprising:

prior to receiving the data transfer request, receiving, from the customer computing device, a trustee enrollment initiation request identifying the one or more trustees to be enrolled in the trust relationship with the customer computing device; and prior to receiving the data transfer request, sending, from the apparatus, a trustee enrollment confirmation request to the one or more trustee computing devices associated with the one or more trustees.

18. The method of claim 11, further comprising:

preventing authorization of the data transfer request in the absence of receipt of the third-party second-factor authentication confirmation and in response to the determination that the customer computing device is associated with the system of trust.

19. The method of claim 11 further comprising, when the customer computing device is associated with the system of trust:

sending the first-party second-factor authentication message to the customer computing device; and authorizing the data transfer system to complete the data transfer request in response to receipt of either the third-party second-factor authentication message or the first-party second-factor authentication message, whichever is received first.

20. A non-transient computer-readable storage medium having instructions embodied thereon, the instructions being executable by one or more processors to perform a method for authorizing one or more data transfers, the method comprising:

receiving, from a data transfer system, a data transfer authorization request, the data transfer authorization request being based on a data transfer initiated by a customer computing device associated with a customer;

determining that the customer computing device is enrolled with a system of trust, where enrollment with the system of trust defines a trust relationship between the customer computing device and one or more trustee computing devices;

when the customer computing device is enrolled with the system of trust:

sending a third-party second-factor authentication message to the one or more trustee computing devices associated with one or more trustees without sending any message to the customer computing device; and authorizing the data transfer system to complete the data transfer request in response to receipt of a third-party authentication confirmation from the one or more trustee computing devices and in the absence of any authentication confirmation from the customer computing device.

* * * * *